(No Model.)
A. W. BROWNE.
FLEXIBLE SHAFT AND COUPLING.
No. 326,941. Patented Sept. 29, 1885.
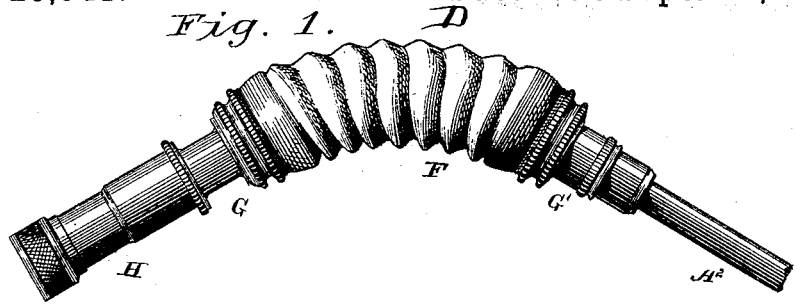
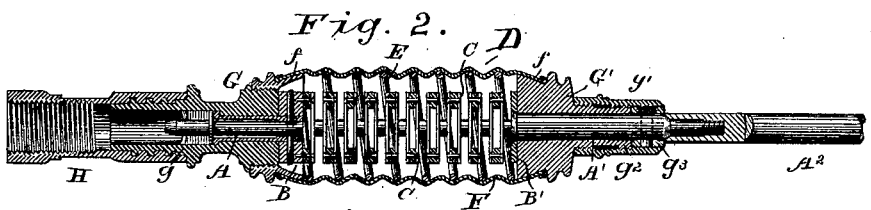
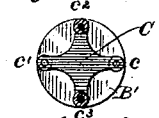
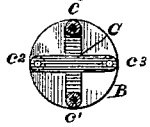
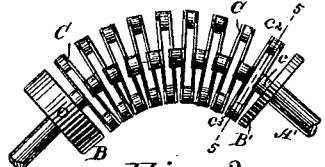
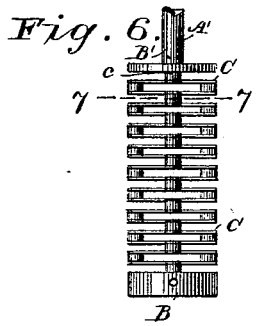
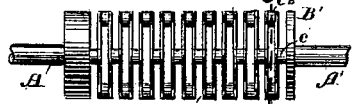
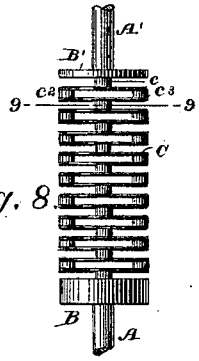
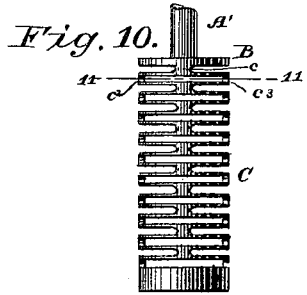
WITNESSES:
Wm J Peyton.
Alan McLane Abert.
INVENTOR:
Arthur W. Browne,
by his attys
Baldwin, Hopkins & Peyton.

UNITED STATES PATENT OFFICE.

ARTHUR W. BROWNE, OF WESTFIELD, NEW YORK, ASSIGNOR TO THE S. S. WHITE DENTAL MANUFACTURING COMPANY, OF PHILADELPHIA, PA.

FLEXIBLE SHAFT AND COUPLING.

SPECIFICATION forming part of Letters Patent No. 326,941, dated September 29, 1885.

Application filed December 20, 1884. (No model.)

*To all whom it may concern:*

Be it known that I, ARTHUR W. BROWNE, of Westfield, in the county of Richmond and State of New York, have invented certain new and useful Improvements in Flexible Shafting and Couplings, of which the following is a specification.

My invention relates to flexible shafting and flexible couplings for shafting; and its object is to provide a simple and efficient flexible shaft, or a flexible coupling for stiff sections of shafting, by which power is conveyed from one driven shaft to another when they are not in line, or lie at an angle to each other, or where one end of the flexible shaft may be fixed, and the opposite end fitted to carry and rotate an operating-tool capable of being moved about to operate in various directions.

The subject-matter claimed herein as my invention is first particularly described in detail as organized and constructed in the best ways now known to me, and my improvements are then distinctly recited at the close of the specification.

Some of the improvements claimed by me may be used without the others, and in organizations differing from that particularly shown in the drawings.

In the accompanying drawings, which form a part of this specification, Figure 1 is a view in elevation of the improved shafting as enveloped by a flexible sleeve or covering, and within which sleeve or covering the shafting rotates. Fig. 2 is a longitudinal central section through the shafting and sleeve thereof, showing in section the several parts which fit the shafting for use with dental engines. Fig. 3 is a view in side elevation of the flexible shaft or coupling detached. Fig. 4 is a view of said shaft or coupling bent or curved, whereby by means of the flexible portion of the shaft or coupling the stiff portions of the shaft may lie at different angles while being rigidly rotated one by the other through said coupling. Fig. 5 is a section through Fig. 3 on the line 5 5, showing a face view of one of the spring-plates making up the flexible shaft or coupling. Figs. 6 and 7 are views of a flexible coupling or shaft made up of spring-plates slightly different in form from that shown in Fig. 5, the plates being shaped as shown in Fig. 7. Fig. 8 is a view of the shafting or coupling made up of another modified form of spring-plates, which in this instance are composed of thin rings, as shown in Fig. 9. Fig. 10 is a view of the flexible shafting or coupling still further modified, in that it consists of a tube having its walls cut through from opposite sides, so as to leave opposite connecting-points, and these connecting-points alternating and being directly opposite for each successive spring-plate formed by cutting the tube. Fig. 11 is a section through Fig. 10 on the line 11 11, showing the slots in the wall of the tube with the connecting-points which terminate the slots.

My invention is designed more especially for use with dental engines or drills, and for use where short bends are to be made in the rotating shafting in order to get the point of the operating drill or tool driven by the shafting into places otherwise inaccessible; but my invention is not limited to this use alone, as it may be used in various ways. For instance, my improved flexible coupling, when made of the proper size, may be made to connect the shafting of machinery, so as to impart motion to shafting which lies at an angle to the main driving-shaft. In short, my improvements are applicable to nearly all machinery and all places where a flexible coupling or universal joint may be required.

In the accompanying drawings, A A' represent two stiff sections of shafting joined together by my improved flexible coupling or shafting. The stiff shaft-sections A A' are attached, respectively, to disks or plates B B', and these disks B B' are connected together by spring-plates C, a series of which are employed. These spring-plates C are parallel to each other, and are connected together so as to be held a short distance apart, the first plate being connected to the second rigidly at two opposite points, $c\ c'$, while the second plate is connected to the third also at two opposite points, $c^2\ c^3$; but these latter opposite points are at right angles to the connecting-points of the first and second plates, and thus the spring-plates are connected together at opposite points, and these opposite points alternate at right angles substantially throughout the series of plates. The last spring-plate is rigidly connected to its disk B in the same manner as the first plate is connected to the opposite disk, whereby there results an exceedingly flexible joint between the stiff sections A A' of the shafting, which permits one section of said shafting to be moved about at various angles relatively to the other section without interfering with the rotating movement imparted from one section to the other. The flexible coupling is perfectly rigid as against rotatable or torsional strain, while, as stated, it permits one section of the shafting to be operated at an angle relatively to the other.

The spring-plates C, which are rigidly connected together, as above described, may be of various shapes, and I have shown several effective shapes in the drawings. For instance, in Figs. 2, 3, 4, and 5 the flexible coupling is made up of spring-plates C, having a central portion with four radiating spring-arms, two of which are united to the corresponding arms of the plate on one side, and the other two of which, at right angles to the first two, are rigidly connected to the corresponding arms of the plate on the opposite side. Figs. 6 and 7 show substantially the same form of plate as is shown in Fig. 5; but greater elasticity is given to the radiating arms by reason of a central portion of less area than that of the plate shown in Fig. 5. In Figs. 8 and 9 the spring-plates consist of thin flexible rings, which are rigidly connected together while held a short distance apart, in substantially the manner described in connection with the other plates. This form, while giving great strength torsionally, is not quite so elastic as the other forms described.

In Figs. 10 and 11 the same result, substantially, is obtained as in the other constructions of flexible coupling before described. In said Figs. 10 and 11 the flexible coupling is made of a metallic tube the walls of which are slotted or cut through, so as to leave opposite connecting-points between the rings thus formed, and with these connecting-points arranged at right angles alternately, as clearly shown. In Fig. 11 a section of this slotted tube of Fig. 10 is shown, which illustrates the opposite connecting-points between two adjacent rings formed by slotting a tube.

In employing my improved flexible coupling or flexible shaft in the construction of dental engines, for instance, I prefer to envelop the flexible shaft by a flexible covering or sheath, D, so that when the flexible shaft is being rotated in driving the dental tool, for instance, there will be no danger of entanglement of the hair, whiskers, or clothing of the patient with the rotating shaft. To this end the stiff shaft-sections A A' are mounted so as to turn in collars G G', respectively, and said collars are connected together by a tube, E, consisting of spirally-wound wire with the members of the spiral separated, as clearly shown in Fig. 2, and over this spiral tubing a covering, F, of flexible material, preferably what is known as "kip" skin, is tightly stretched, whereby, inasmuch as the flexible coupling rotates within this cover or sheath, all danger of entanglement of the hair or anything else with the rotating shaft is avoided. The covering F is preferably crimped between the coils of the wire tube E, as shown, and the collars G G' have preferably cone-surfaces $f$, for the better securing and attachment thereto of the ends of the covering F.

The collar G' is preferably fitted with a thimble, $g'$, extending beyond the reduced end $g^2$ of said collar, so as to form a seat for an adjustable collar, $g^3$, whereby the shaft-section A' is secured from endwise movement in said collar G, while fitted to rotate freely when driven by the rotating shaft $A^2$, (shown in Fig. 2,) on which the driving-pulley of the engine may be mounted, for example, as usual.

The collar G is preferably provided with a section, $g$, to a tubular extension of which the rear section, H, of the hand-piece casing may be detachably secured by screw-threads in a well-known way. The main portions of the hand-piece, as well as the chuck or tool-holder thereof, are not shown in the drawings, as they form no part of the present invention.

It will be understood of course that the front end of the shaft-section A will be connected with the rear end of the tool-holder or chuck of the hand-piece so as to drive it.

In Fig. 1 the capability of the hand-piece to be turned at an angle to the driving-shaft A' $A^2$ is illustrated, and this is accomplished without varying the length, either of the flexible shaft or coupling, or of the flexible sleeve or covering which envelops it. When the hand-piece in the manipulations of the dentist is turned or bent either to a greater or less extent in guiding or directing the operating-tool, the flexible shaft or coupling is contracted in length or compacted on one side and expanded on the other, and this is due to the flexing or bending of the spring-plates making up the coupling, and a similar effect is produced in the sheath or covering of the flexible coupling by reason of the coils or members of the spiral tube E being separated. The bending of the sleeve contracts the members of the spiral on one side and expands them on the other, and inasmuch as the covering F is flexible in the longitudinal line of the shafting it expands or is stretched at one side to accommodate the expansion of the spiral tube.

In connecting stiff sections of shafting for general purposes in operative machinery, where one section of the shaft is to be driven at an angle to the other section, it may or may not be desirable to envelop the flexible coupling in a covering or sheath. Where it is desirable to do so, the covering or sheath I have described will be found very effective.

In the example shown in Figs. 1 and 2, where I have shown my improvements as adapted for use in dental engines, the sheath or cover D for the flexible couping is connected with the hand-piece H, and in operation remains stationary while protecting the revolving shafts and coupling within it, inasmuch as the hand-piece of a dental engine is grasped by the hand of the operator for the purpose of directing the revolving tool, which is driven by the chuck of the hand-piece to do its work.

Before stating my claim herein I wish it to be understood that I do not limit myself to the details of shape or material of the spring-plates making up the flexible coupling. I believe I am the first ever to have made a flexible shaft or a flexible coupling for stiff sections of shafting made up of parallel spring-plates rigidly united together, with the capacity in said coupling or said shafting of affording a rigid rotating or torsional driving-connection with the capability of flexing freely, so that one section of the shafting may be operated at an angle to the other without interfering with the driving-power.

I claim herein—

1. A flexible shaft or coupling consisting of a series of substantially-parallel spring-plates rigidly connected together, substantially as described.

2. A flexible shaft consisting of stiff sections connected together by a coupling consisting of substantially-parallel spring-plates rigidly connected together at opposite points, and these points alternating so as to be at right angles or substantially at right angles to each other throughout the series of plates, substantially as described.

3. In combination with a flexible shaft, a flexible sheath or cover consisting of a tube of spirally-wound wire, the spirals or members of which are separated, so that the tube may be bent without affecting its length, and of a covering of elastic material crimped between the coils of the wire, substantially as described.

4. The combination of the stiff shaft-sections connected together by a flexible coupling, collars having tapered or coned peripheral surfaces fitted to receive said stiff shaft-sections and form bearings therefor at each side of said coupling, and a sheath or cover for said coupling, consisting of a wire tube connecting said collars, and of a flexible covering surrounding said wire tube and attached to said collars at the tapering surfaces, substantially as described.

In testimony whereof I have hereunto subscribed my name.

ARTHUR W. BROWNE.

Witnesses:
W. A. JOHNSTON,
ELI T. STARR.